US011915839B2

(12) United States Patent
Farkas et al.

(10) Patent No.: US 11,915,839 B2
(45) Date of Patent: Feb. 27, 2024

(54) DATA COMMUNICATIONS CABLE THAT UTILIZES MULTIPLE DIELECTRIC MATERIALS ASSOCIATED WITH DIFFERENT RELATIVE PERMITTIVITIES

(71) Applicant: Dell Products L.P., Round Rock, TX (US)

(72) Inventors: Sandor Farkas, Round Rock, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/648,951

(22) Filed: Jan. 26, 2022

(65) Prior Publication Data

US 2023/0238157 A1 Jul. 27, 2023

(51) Int. Cl.
*H01B 11/08* (2006.01)
*H01B 11/18* (2006.01)
*H01B 11/00* (2006.01)

(52) U.S. Cl.
CPC ....... *H01B 11/1834* (2013.01); *H01B 11/002* (2013.01); *H01B 11/1895* (2013.01)

(58) Field of Classification Search
CPC .......... H01B 3/308; H01B 3/30; H01B 3/441; H01B 7/02; H01B 7/0216; H01B 7/046; H01B 7/295; H01B 11/183; H01B 11/002; H01B 11/0216; H01B 11/203; H01B 7/0241; H01B 7/0291; H01B 11/005; H01B 11/1895; H01B 11/06; H01B 11/08; H01B 11/20; H01B 13/08; H01B 13/22; H01B 13/141
USPC ............. 174/102 R, 108, 109, 110 R, 113 R, 174/120 R–122 R
See application file for complete search history.

(56) References Cited

U.S. PATENT DOCUMENTS

| | | | | |
|---|---|---|---|---|
| 6,403,887 B1 * | 6/2002 | Kebabjian | H01B 11/1025 | 174/113 R |
| 6,600,108 B1 * | 7/2003 | Mydur | H01B 7/046 | 385/101 |
| 7,358,436 B2 * | 4/2008 | Dellagala | H01B 11/002 | 174/27 |
| 9,142,333 B2 * | 9/2015 | Kaga | H01B 11/1839 | |
| 9,159,470 B2 * | 10/2015 | Mutnury | H01B 7/0861 | |
| 9,299,481 B2 * | 3/2016 | Ishikawa | H01B 11/002 | |
| 10,347,397 B2 * | 7/2019 | Armbrecht | H01B 7/0216 | |
| 2007/0158095 A1 * | 7/2007 | Sridhar | H01B 7/2806 | 174/106 R |

(Continued)

*Primary Examiner* — William H. Mayo, III
(74) *Attorney, Agent, or Firm* — McDermott Will & Emery LLP

(57) ABSTRACT

A data communications cable may communicatively coupled two components associated with an information handling system. For example, the data communications cable may include: a differential pair of conductors; a first dielectric material, associated with a first relative permittivity, surrounding the differential pair of conductors; and a second dielectric material, associated with a second relative permittivity, surrounding the first dielectric material. For instance, the first relative permittivity may be greater than the second relative permittivity, and a distance between the differential pair of conductors may vary plus or minus an amount with a length of the data communications cable.

12 Claims, 14 Drawing Sheets

(56) References Cited

U.S. PATENT DOCUMENTS

| | | | | |
|---|---|---|---|---|
| 2013/0312992 | A1* | 11/2013 | Guetig | H01B 11/1891 174/34 |
| 2014/0305676 | A1* | 10/2014 | Sugiyama | H01B 11/1839 174/102 R |
| 2018/0090243 | A1* | 3/2018 | Farkas | H01B 13/016 |
| 2018/0294076 | A1* | 10/2018 | Farkas | H05K 1/112 |
| 2018/0366243 | A1* | 12/2018 | Farkas | H01B 11/20 |

* cited by examiner

DATA COMMUNICATIONS CABLE THAT UTILIZES MULTIPLE DIELECTRIC MATERIALS ASSOCIATED WITH DIFFERENT RELATIVE PERMITTIVITIES

BACKGROUND

Field of the Disclosure

This disclosure relates generally to information handling systems and more particularly to a data communications cable that utilizes multiple dielectric materials associated with different relative permittivities.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may include: at least one processor; a memory medium, coupled to the at least one processor, that stores instructions executable by the at least one processor; a first information handling system component; and a data communications cable configured to communicatively couple the first component to a second information handling system component. In one or more embodiments, the data communications cable may include: a differential pair of conductors; a first dielectric material, associated with a first relative permittivity, surrounding the differential pair of conductors; and a second dielectric material, associated with a second relative permittivity, surrounding the first dielectric material. For example, the first relative permittivity may be greater than the second relative permittivity. For instance, a distance between the differential pair of conductors may vary plus or minus an amount with a length of the data communications cable.

In one or more embodiments, the data communications cable may further include a conductive shield surrounding the second dielectric material. In one or more embodiments, the information handling system may include the second component. In one or more embodiments, the second component may be external to the information handling system. In one or more embodiments, the data communications cable may further include a drain conductor outside the second dielectric material. In one or more embodiments, the data communications cable may further include a first connector at a first end of the data communications cable configured to be connected to the first component and a second connector at a second end of the data communications cable configured to be connected to the second component.

In one or more embodiments, the first dielectric material may form a cuboid between the differential pair of conductors. In one example, the cuboid between the differential pair of conductors may be a rectangular cuboid between the differential pair of conductors. In a second example, the first dielectric material may form a first half ring surrounding a first conductor of the differential pair of conductors, and the first dielectric material may form a second half ring surrounding a second conductor of the differential pair of conductors. In a third example, the second dielectric material may form a first half ring surrounding the first dielectric material, and the second dielectric material may form a second half ring surrounding the first dielectric material. In another example, the second dielectric material may form a first rectangular cuboid between the first half ring and the second half ring, and the second dielectric material may form a second rectangular cuboid between the first half ring and the second half ring.

In one or more embodiments, a data communications cable may include: a differential pair of conductors; a first dielectric material, associated with a first relative permittivity, surrounding the differential pair of conductors; and a second dielectric material, associated with a second relative permittivity, surrounding the first dielectric material. In one or more embodiments, the first relative permittivity may be greater than the second relative permittivity. In one or more embodiments, a distance between the differential pair of conductors may vary plus or minus an amount with a length of the data communications cable. In one or more embodiments, the data communications cable may further include a drain conductor outside the second dielectric material. In one or more embodiments, the data communications cable may further include a first connector at a first end of the data communications cable configured to be connected to a first information handling system component associated with an information handling system and a second connector at a second end of the data communications cable configured to be connected to a second information handling system component associated with the information handling system.

In one or more embodiments, the data communications cable may further include a conductive shield surrounding the second dielectric material. In one or more embodiments, the first dielectric material may form a cuboid between the differential pair of conductors. In one example, the cuboid between the differential pair of conductors may be a rectangular cuboid between the differential pair of conductors. In a second example, the first dielectric material may form a first half ring surrounding a first conductor of the differential pair of conductors, and the first dielectric material may form a second half ring surrounding a second conductor of the differential pair of conductors. In a third example, the second dielectric material may form a first half ring surrounding the first dielectric material, and the second dielectric material may form a second half ring surrounding the first dielectric material. In another example, the second dielectric material may form a first rectangular cuboid between the first half ring and the second half ring; and the second dielectric material form a second rectangular cuboid between the first half ring and the second half ring.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
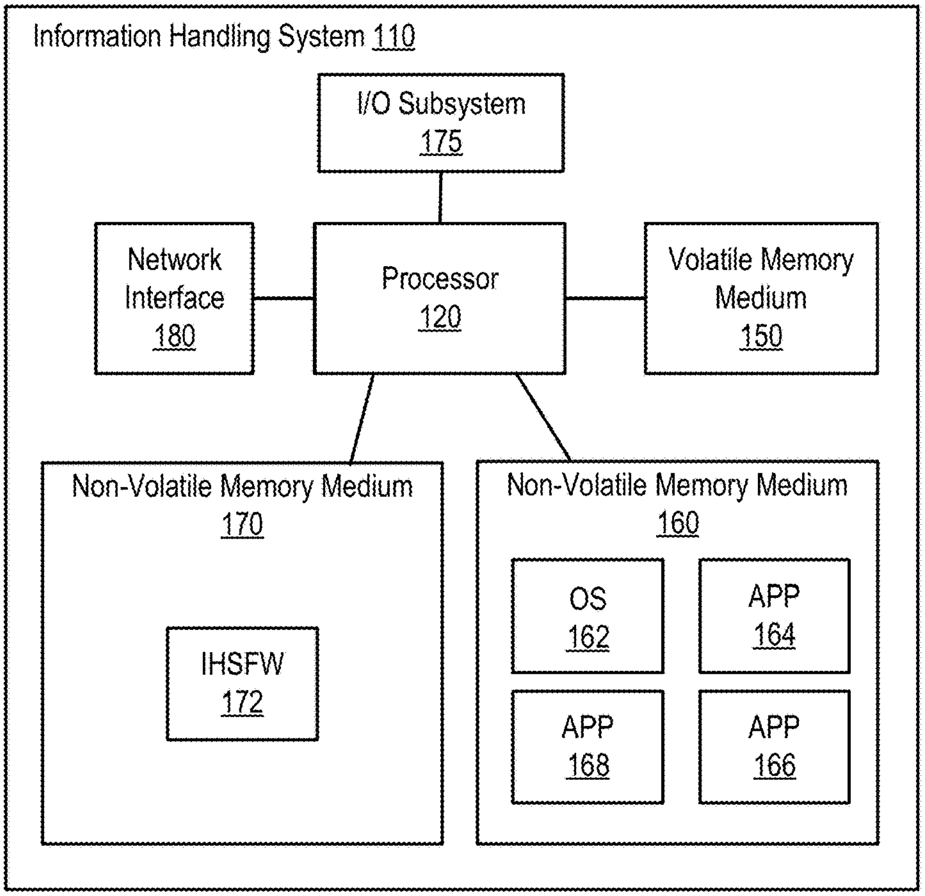
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more data communications cables may be utilized to communicatively couple two or more information handling system components of an information handling system. For example, an information handling system component of an information handling system may include a processor, a volatile memory medium, a non-volatile memory medium, an I/O subsystem, and a network interface, a printed circuit board (PCB), and an expansion card (e.g., a host bus adapter, a video card, a network adapter card, etc.), among others. In one or more embodiments, a data communications cable may provide a lower loss mode for signal propagation than a PCB. In one example, a Peripheral Component Interconnect Express (PCIe) topology may utilize one or more communication cables. In another example, a SAS (Serial Attached SCSI) topology may utilize one or more communication cables.

In one or more embodiments, an intra-pair skew may be associated with a communication cable. In one example, a skew may be a delay between positive and negative signals of a differential pair of conductors. In one instance, a skew may be ten picoseconds (10 ps). In another instance, a skew may be seven picoseconds (7 ps). In another example, a skew may be a phase difference between positive and negative signals of a differential pair of conductors. As faster communications and/or faster signaling speeds are desired or required, a skew may be reduced, according to one or more embodiments. In one or more embodiments, a skew associated with a differential pair of conductors may introduce one or more of insertion loss, signal degradation, and common mode issues, among others.

In one or more embodiments, matching two conductors in a differential pair of conductors may be based at least on manufacturing tolerances. For example, matching two conductors in a differential pair of conductors may be based at least on manufacturing tolerances in geometry and/or concentricity. For instance, a skew associated with the differential pair of conductors may be based at least on the manufacturing tolerances in geometry and/or concentricity. In one or more embodiments, the manufacturing tolerances may be high-volume manufacturing (HVM) tolerances. For example, HVM may introduce one or more imprecisions in manufacturing communication cables, which may be compensated via a design of a data communications cable.

In one or more embodiments, shaping electric field intensity to be minimized near an outer perimeter of a dielectric may be utilized when one or more tolerances in manufacturing communication cables are reduced. For example, electric fields may not be significantly affected by a location of a center conductor. For instance, capacitance, impedance, and propagation delay may not be sensitive to manufacturing tolerances, which may exist in a HVM environment.

In one or more embodiments, a data communications cable may include a single uniform dielectric material around a conductor. In one or more embodiments, a data communications cable may include multiple dielectric materials around a conductor. For example, a data communications cable may include two dielectric materials around a conductor. For instance, an innermost dielectric material of the communication cable may have a higher relative permittivity ($\varepsilon_r$) compared with an outer dielectric material of the communication cable. In one or more embodiments, a dual dielectric material data communications cable may have an even electric field distribution. For example, a higher $\varepsilon_r$ near a center of the dual dielectric material communication cable may have a lower voltage drop across a cross section of the dual dielectric material data communications cable, which may increase energy in an outer region of the dual dielectric material communication cable. For instance, a voltage drop may be measured along a radius of a cross section of the dual dielectric material data communications cable, in which a radius of zero (0) measurement is a center of a conductor of the dual dielectric material data communications cable. In one or more embodiments, a dual dielectric material data communications cable may include one or more transmission lines.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
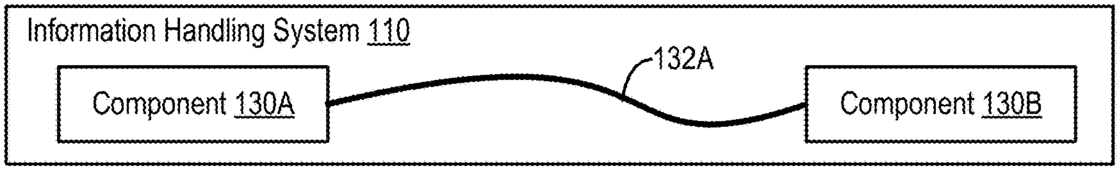
FIG. 1B illustrates an example of an information handling system with a data communications cable communicatively coupling two information handling system components, according to one or more embodiments.

Turning now to FIG. 1B, an example of an information handling system with a data communications cable communicatively coupling two information handling system components is illustrated, according to one or more embodiments. In one or more embodiments, IHS 110 may include information handling system components 130A and 130B. For example, an information handling system component 130 may include a processor, a volatile memory medium, a non-volatile memory medium, an I/O subsystem, and a network interface, a PCB, and an expansion card (e.g., a host bus adapter, a video card, a network adapter card, etc.), among others. In one or more embodiments, a data communications cable 132A may communicatively couple information handling system component 130A and information handling system component 130B. For example, a data communications cable 132 may include one or more differential pairs of conductors. For instance, information handling system component 130A and information handling system component 130B may communicate data via one or more differential pairs of conductors via data communications cable 132A. In one or more embodiments, a data communications cable 132 may include multiple conductors, multiple dielectric materials associated with respective multiple relative permittivities, and/or one or more conductive shields, among others. In one or more embodiments, a data communications cable 132 may include a drain conductor. For example, a data communications cable 132 may include a drain wire.

Figure 1C:
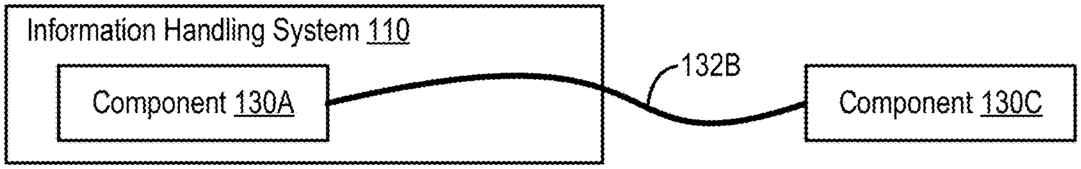
FIG. 1C illustrates another example of an information handling system with a data communications cable communicatively coupling two information handling system components, according to one or more embodiments.

Turning now to FIG. 1C, a second example of an information handling system with a data communications cable communicatively coupling two information handling system components is illustrated, according to one or more embodiments. In one or more embodiments, IHS 110 may include information handling system component 130A, and an information handling system component 130C may be external to IHS 110. For example, an information handling system component 130 may include a processor, a volatile memory medium, a non-volatile memory medium, an I/O subsystem, and a network interface, a PCB, and an expansion card (e.g., a host bus adapter, a video card, a network adapter card, etc.), among others. In one or more embodiments, a data communications cable 132B may communicatively couple information handling system component 130A and information handling system component 130C. For example, a data communications cable 132 may include one or more differential pairs of conductors. For instance, information handling system component 130A and information handling system component 130C may communicate data via one or more differential pairs of conductors via data communications cable 132B. In one or more embodiments, a data communications cable 132 may include multiple conductors, multiple dielectric materials associated with respective multiple relative permittivities, and/or one or more conductive shields, among others.

Figure 2:
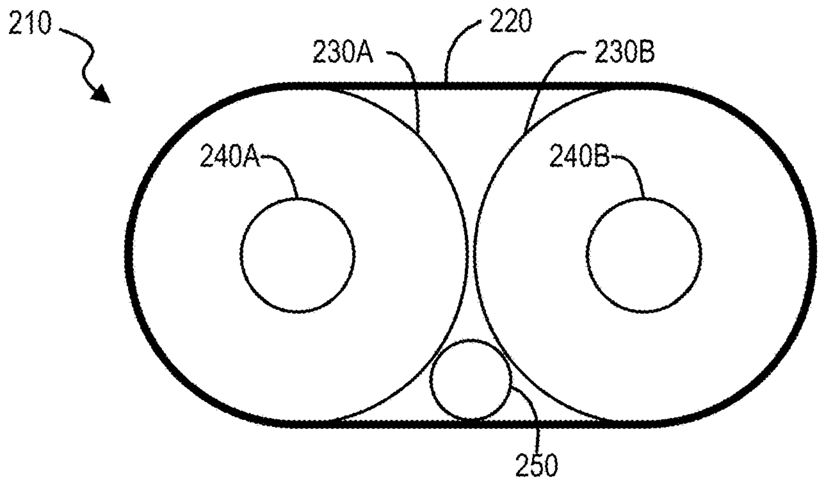
FIG. 2 illustrates an example of cross section of a dual axial cable with single drain conductor, according to one or more embodiments.

Turning now to FIG. 2, an example of cross section of a dual axial cable with single drain conductor is illustrated, according to one or more embodiments. In one or more embodiments, a dual axial cable with single drain conductor 210 may include a conductive shield 220. For example, shield 220 may be coupled to a ground. In one instance, the ground may be a chassis ground of IHS 110. In another instance, the ground may be a ground between two information handling system components 130 (e.g., information handling system components 130A and 130B, information handling system components 130A and 130C, etc.).

In one or more embodiments, dual axial cable 210 may include conductors 240A and 240B. For example, conductors 240A and 240B may be a differential pair of conductors. For instance, signals transferred via conductors 240A and 240B may be referenced to a drain conductor 250. In one or more embodiments, shield 220 may implement a Faraday cage for conductors 240A and 240B. In one or more embodiments, conductors 240A and 240B may be respectively surrounded by dielectric materials 230A and 230B. For example, dual axial cable 210 may include dielectric materials 230A and 230B.

Figure 3A:
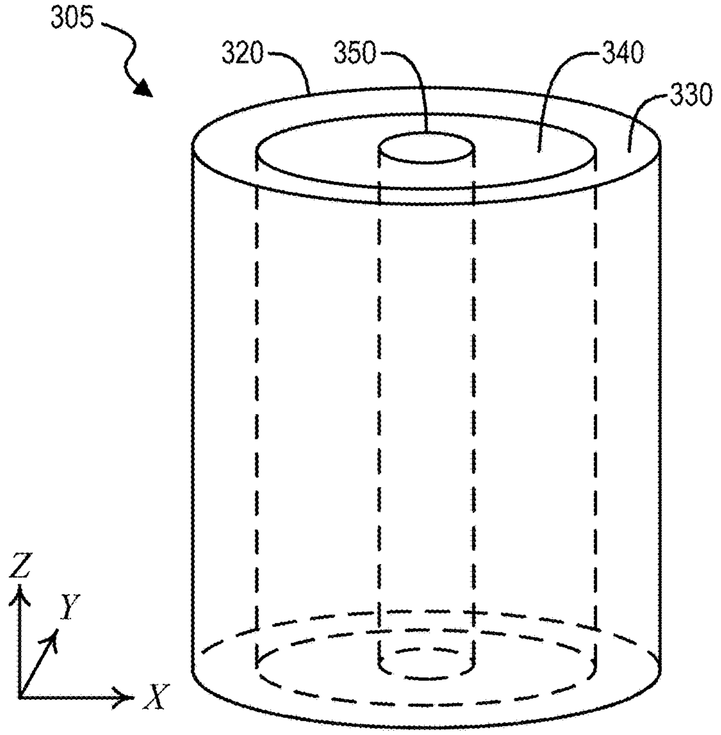
FIG. 3A illustrates an example of a section of a data communications cable that includes multiple dielectrics, according to one or more embodiments.

Turning now to FIG. 3A, an example of a section of a data communications cable that includes multiple dielectrics is illustrated, according to one or more embodiments. In one or more embodiments, data communications cable 305 may include a conductor 350. For example, conductor 350 may be surrounded by a dielectric material 340. For instance, dielectric material 340 may be surrounded by a dielectric material 330. In one or more embodiments, dielectric material 340 may be associated with a first relative permittivity, and dielectric material 330 may be associated with a second relative permittivity. In one example, the first relative permittivity may be the second relative permittivity. In another example, the first relative permittivity may be different from the second relative permittivity. In one or more embodiments, data communications cable 305 may include a conductive shield 320. For example, conductive shield 320 may surround dielectric material 330. For instance, conductive shield 320 may implement a Faraday cage for conductor 350.

In one or more embodiments, a dielectric material may be or may include an electrical insulator, which may be polarized by an applied electric field. For example, when a dielectric material is placed in an electric field, electric charge does not flow through the dielectric material as it would in an electrical conductor. In one instance, the dielectric material may not include loosely bound or free electrons that drift through the dielectric material. In another instance, electrons of the dielectric material may shift slightly from respective average equilibrium positions, which may cause dielectric polarization.

In one or more embodiments, the dielectric polarization may cause positive charges to displace in a direction of an electric field and may cause negative charges shift in a direction opposite to the electric field. For example, if the electric field is in a direction of a vector, the positive charges may shift in the direction of the vector while the negative charges may shift in a direction negative to the vector. In one or more embodiments, an internal electric field may be created in the dielectric material, which may reduce an overall electric field within the dielectric material. In one or more embodiments, the term insulator may imply low electrical conduction. For example, a dielectric material may typically mean a material with a high polarizability, which may be expressed by a number called a relative permittivity associated with a dielectric material. In one or more embodiments, the term insulator may be utilized to indicate electrical obstruction while the term dielectric may be utilized to indicate an energy storing capacity of a material (e.g., by means of polarization).

Figure 3B:
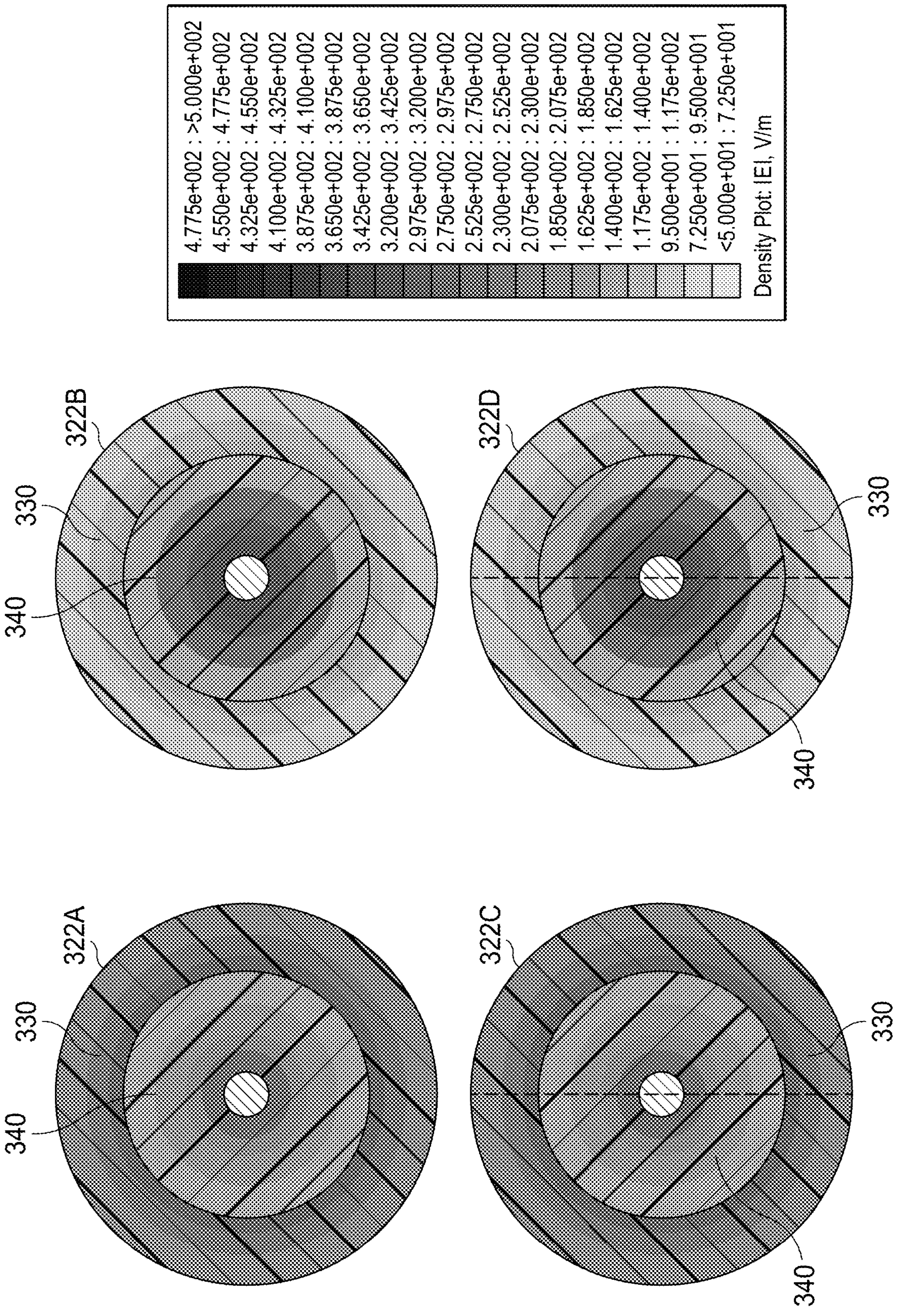
FIG. 3B illustrates example plots of electric field intensities within a data communications cable, according to one or more embodiments.

Turning now to FIG. 3B, example plots of electric field intensities within a data communications cable are illustrated, according to one or more embodiments. In one or more embodiments, if the first relative permittivity associated with dielectric material 340 is equal to the second relative permittivity associated with dielectric material 330, an electric field within data communications cable 305 may not be evenly distributed. For example, a plot 322B shows a high electric field values surrounding conductor 350.

In one or more embodiments, if the first relative permittivity associated with dielectric material 340 is greater than the second relative permittivity associated with dielectric material 330, an electric field within data communications cable 305 may be evenly distributed. For example, a plot 322A shows more evenly distributed and/or lower electric field values surrounding conductor 350, when compared to plot 322B. In one instance, if high electric field values surrounding conductor 350 are present in data communications cable 305, an impedance associated with data communications cable 305 may increase. In another instance, if high electric field values surrounding conductor 350 are present in data communications cable 305, a capacitance associated with data communications cable 305 may increase.

In one or more embodiments, if the first relative permittivity associated with dielectric material 340 is equal to the second relative permittivity associated with dielectric material 330, an electric field within data communications cable 305 may not be evenly distributed when conductor 350 is off-center within data communications cable 305. For example, a plot 322D shows a high electric field values surrounding conductor 350 when conductor 350 is off-center within data communications cable 305.

In one or more embodiments, if the first relative permittivity associated with dielectric material 340 is greater than the second relative permittivity associated with dielectric material 330, an electric field within data communications cable 305 may be evenly distributed when conductor 350 is off-center within data communications cable 305. For example, a plot 322C shows more evenly distributed and/or lower electric field values surrounding conductor 350 if conductor 350 is off-center within data communications cable 305, when compared to plot 322D. In one instance, if high electric field values surrounding conductor 350 are present in data communications cable 305, an impedance associated with data communications cable 305 may increase. In another instance, if high electric field values surrounding conductor 350 are present in data communications cable 305, a capacitance associated with data communications cable 305 may increase. As one example, an impedance associated with a data communications cable 305 may not substantially increase as shown in plot 322A, which data communications cable 305 may be manufactured without the one or more imprecisions in manufacturing (e.g., ideally manufactured), and in plot 322C, which data communications cable 305 may be manufactured with the one or more imprecisions in manufacturing. For instance, plots 322A and 322C may illustrate a small or negligible impedance change of data communications cable 305 manufactured with the one or more imprecisions in manufacturing when a relative permittivity of dielectric material 340 is greater than a relative permittivity of dielectric material 330. As another example, an impedance associated with a data communications cable 305 may not substantially increase as shown in plot 322B, which data communications cable 305 may be manufactured without the one or more imprecisions in manufacturing (e.g., ideally manufactured), and in plot 322D, which data communications cable 305 may be manufactured with the one or more imprecisions in manufacturing. For instance, plots 322B and 322D may illustrate a small or negligible impedance change of data communications cable 305 manufactured with the one or more imprecisions in manufacturing when a relative permittivity of dielectric material 340 is greater than a relative permittivity of dielectric material 330.

Figure 3C:
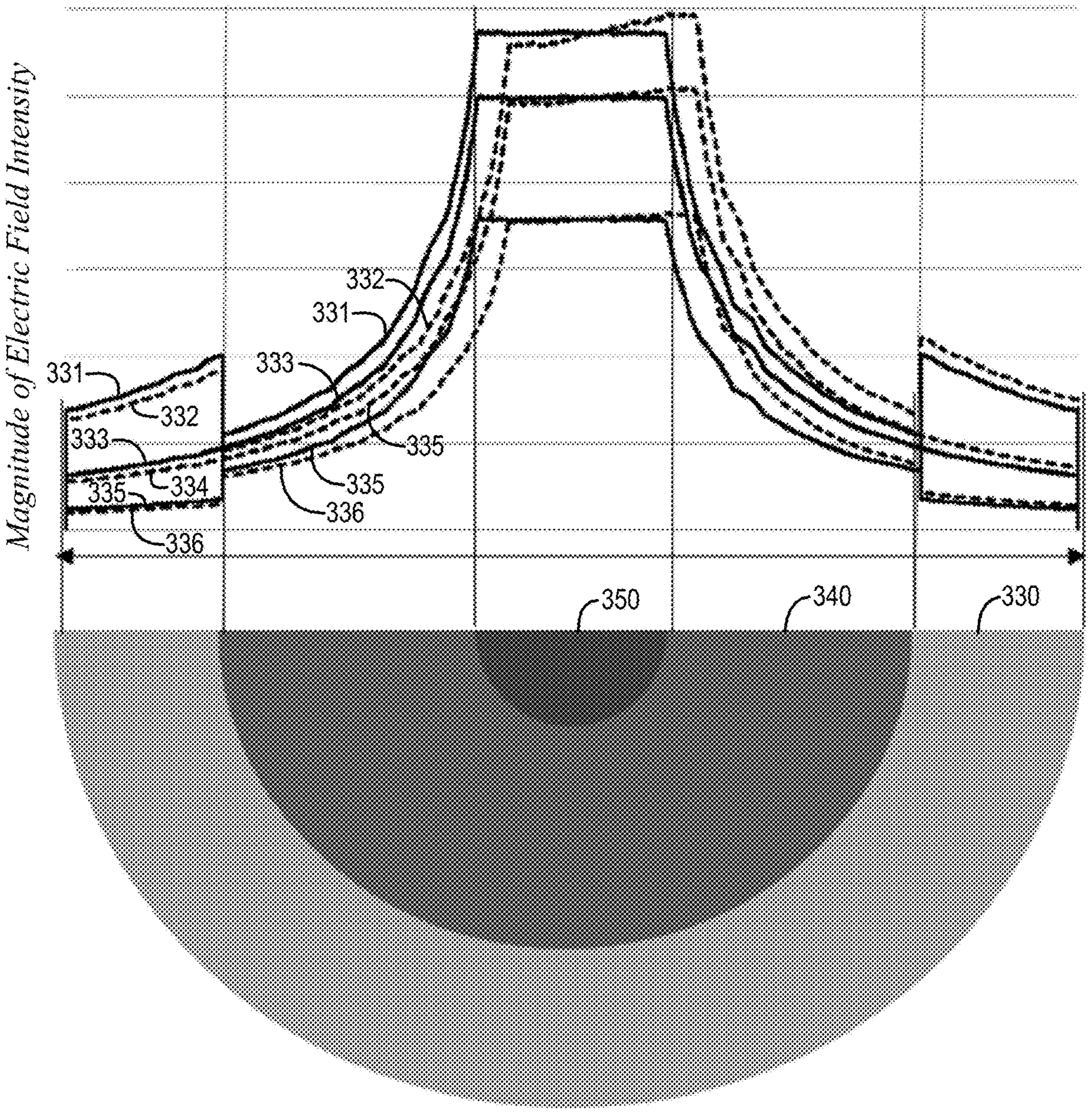
FIG. 3C illustrates example plots of magnitudes of electric field intensities, according to one or more embodiments.

Turning now to FIG. 3C, example plots of magnitudes of electric field intensities are illustrated, according to one or more embodiments. Plots 331 and 332 illustrate magnitudes of electric field intensities for a relative permittivity of dielectric material 340 greater than a relative permittivity of dielectric material 330. In one example, plot 331 is associated with conductor 350 centered. In another example, plot 332 is associated with conductor 350 not centered or off-center. Plots 333 and 334 illustrate magnitudes of electric field intensities for a relative permittivity of dielectric material 340 equal to a relative permittivity of dielectric material 330. In one example, plot 333 is associated with conductor 350 centered. In another example, plot 334 is associated with conductor 350 not centered or off center. Plots 335 and 336 illustrate magnitudes of electric field intensities for a relative permittivity of dielectric material 340 less than a relative permittivity of dielectric material 330. In one example, plot 335 is associated with conductor 350 centered. In another example, plot 336 is associated with conductor 350 not centered or off-center. In one or more embodiments, a relative permittivity of dielectric material 340 less than a relative permittivity of dielectric material 330 may not be advantageous. For example, plots 335 and 336 show higher magnitudes of electric field intensities near conductor 350 compared to plots 331 and 332, which are associated with a relative permittivity of dielectric material 340 greater than a relative permittivity of dielectric material 330.

Figure 3D:
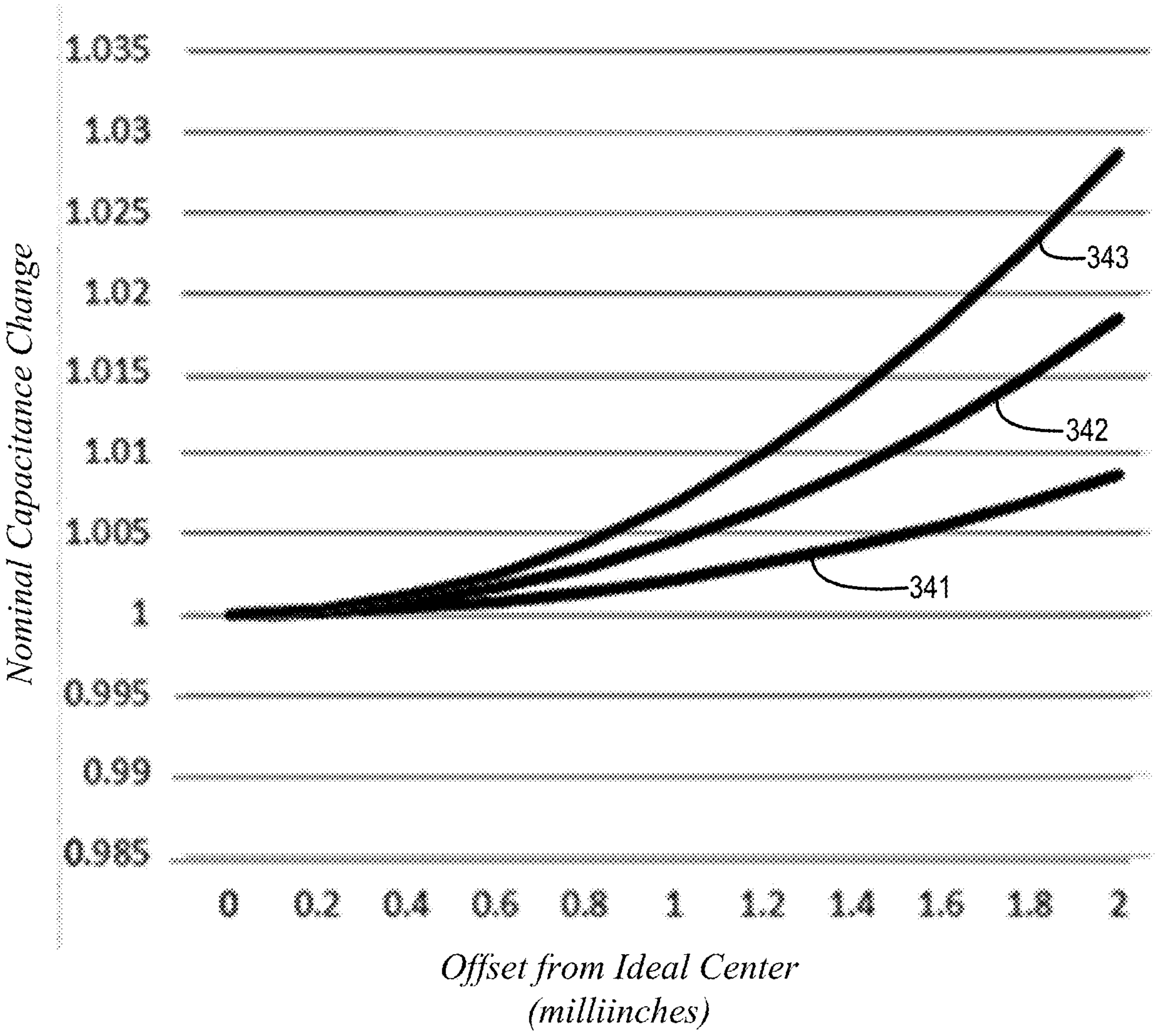
FIG. 3D illustrates example plots of normalized capacitance change versus offsets from a center, according to one or more embodiments.

Turning now to FIG. 3D, example plots of normalized capacitance change versus offsets from a center are illustrated, according to one or more embodiments. In one or more embodiments, a vertical axis of plots 341-343 may be determined via determining a capacitance associated with conductor 350 when conductor 350 is not centered divided by a capacitance associated with conductor 350 when conductor 350 is centered to provide normalized capacitance values. Plot 341 illustrates normalized capacitance change versus offsets from a center of dielectric material 340 for a relative permittivity of dielectric material 340 greater than a relative permittivity of dielectric material 330. Plot 342 illustrates normalized capacitance change versus offsets from a center of dielectric material 340 for a relative permittivity of dielectric material 340 equal to a relative permittivity of dielectric material 330. Plot 343 illustrates normalized capacitance change versus offsets from a center of dielectric material 340 for a relative permittivity of dielectric material 340 less than a relative permittivity of dielectric material 330.

Figure 3E:
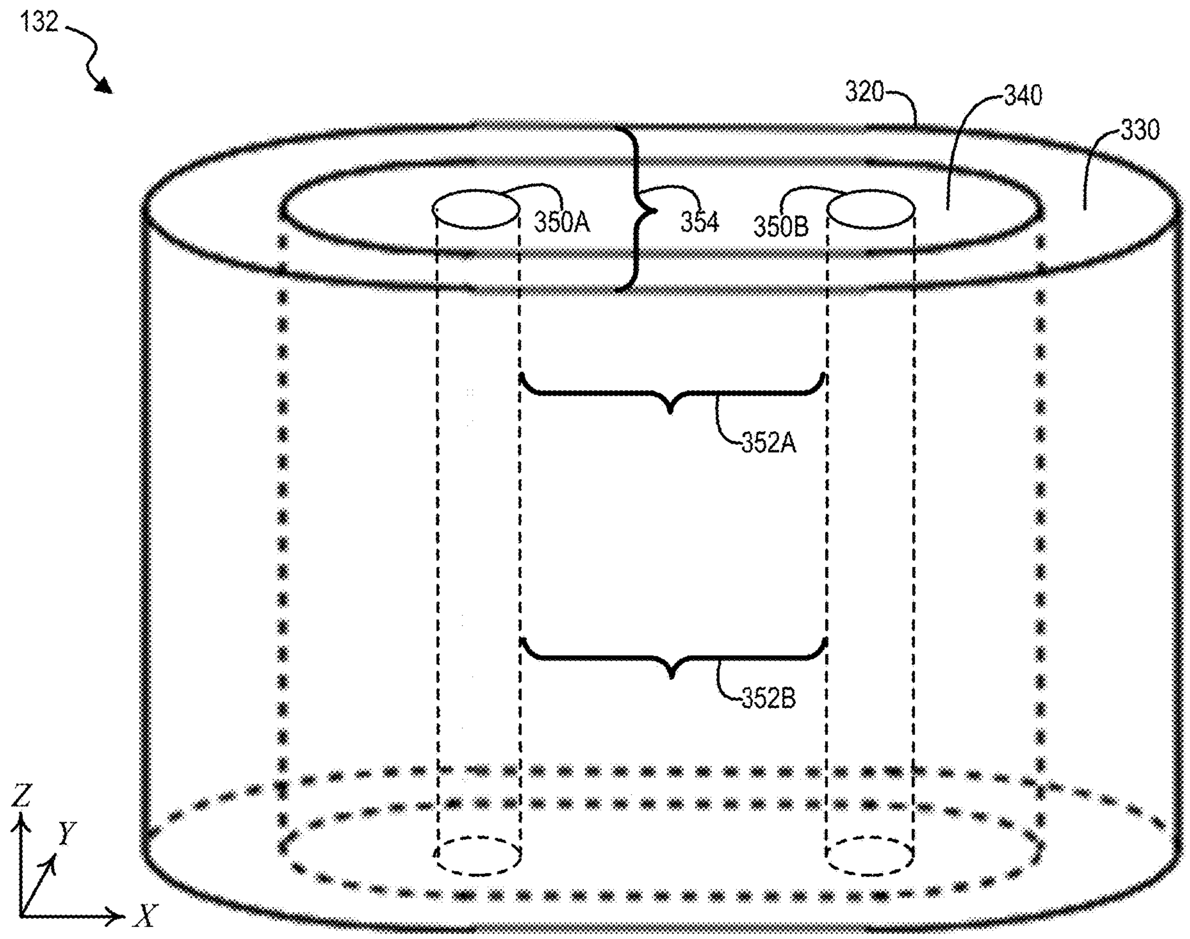
FIG. 3E illustrates an example of a section of a data communications cable that includes multiple conductors and multiple dielectrics, according to one or more embodiments.

Turning now to FIG. 3E, an example of a section of a data communications cable that includes multiple conductors and multiple dielectrics is illustrated, according to one or more embodiments. In one or more embodiments, data communications cable 132 may include conductors 350A and 350B. For example, conductors 350A and 350B may be surrounded by dielectric material 340. For instance, dielectric material 340 may be surrounded by dielectric material 330. In one or more embodiments, conductors 350A and 350B may be embedded in dielectric material 340. In one or more embodiments, dielectric material 340 may be associated with a first relative permittivity, and dielectric material 330 may be associated with a second relative permittivity. In one example, the first relative permittivity may be the second relative permittivity. In another example, the first relative permittivity may be different from the second relative permittivity.

In one or more embodiments, data communications cable 132 may include conductive shield 320. For example, conductive shield 320 may surround dielectric material 330. For instance, conductive shield 320 may implement a Faraday cage for conductors 350A and 350B. In one or more embodiments, conductors 350A and 350B may be a differential pair of conductors. For example, conductors 350A and 350B may be thirty-two American wire gauge (32 AWG) wires or may be about 32 AWG. In one or more embodiments, conductors 350A and 350B may be a distance 352A and may be a distance 352B. For example, distance 352A may be different from distance 352B. For instance, distances 352A and 352B may be within manufacturing tolerances, and distance 352A may be different from distance 352B. In one or more embodiments, a difference between distances 352A and 352B may be zero (0) milliinches to four (4) milliinches. For example, a distance between differential pair of conductors 350A and 350B may vary plus or minus an amount, such as two (2) milliinches, with a length of data communications cable 132.

In one or more embodiments, one or more imprecisions introduced in manufacturing communication cables may be compensated with a relative permittivity associated with dielectric material 340 being greater than a relative permittivity associated with dielectric material 330. For example, distance 352A being different from distance 352B may be compensated with a relative permittivity associated with dielectric material 340 being greater than a relative permittivity associated with dielectric material 330. In one or more embodiments, a distance 354 may be 0.65 millimeters (mm) or may be about 0.65 mm.

Figure 3F:
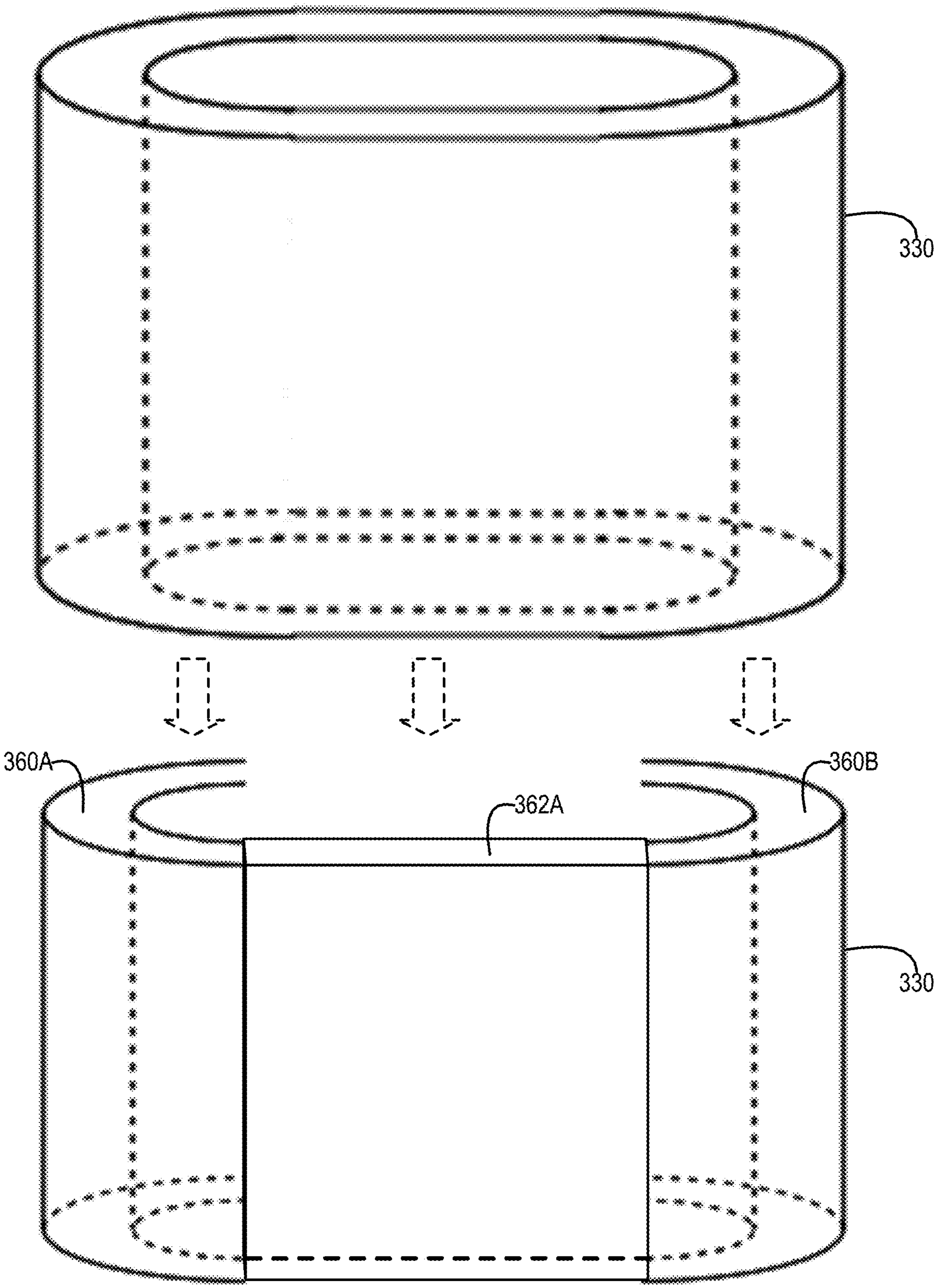
FIG. 3F illustrates an example of a dielectric material that forms a first rectangular cuboid between a first half ring and a second half ring, according to one or more embodiments.

Turning now to FIG. 3F, an example of a dielectric material that forms a first rectangular cuboid between a first half ring and a second half ring is illustrated, according to one or more embodiments. In one or more embodiments, dielectric material 330 may form a first half ring 360A and a second half ring 360B. For example, dielectric material 330 may form first half ring 360A and second half ring 360B surrounding dielectric material 340. In one or more embodiments, dielectric material 330 may form a first cuboid 362A. For example, cuboid 362A may be a rectangular cuboid. In one or more embodiments, cuboid 362A may be between half ring 360A and half ring 360B. For example, cuboid 362A may be formed between half ring 360A and half ring 360B.

Figure 3G:
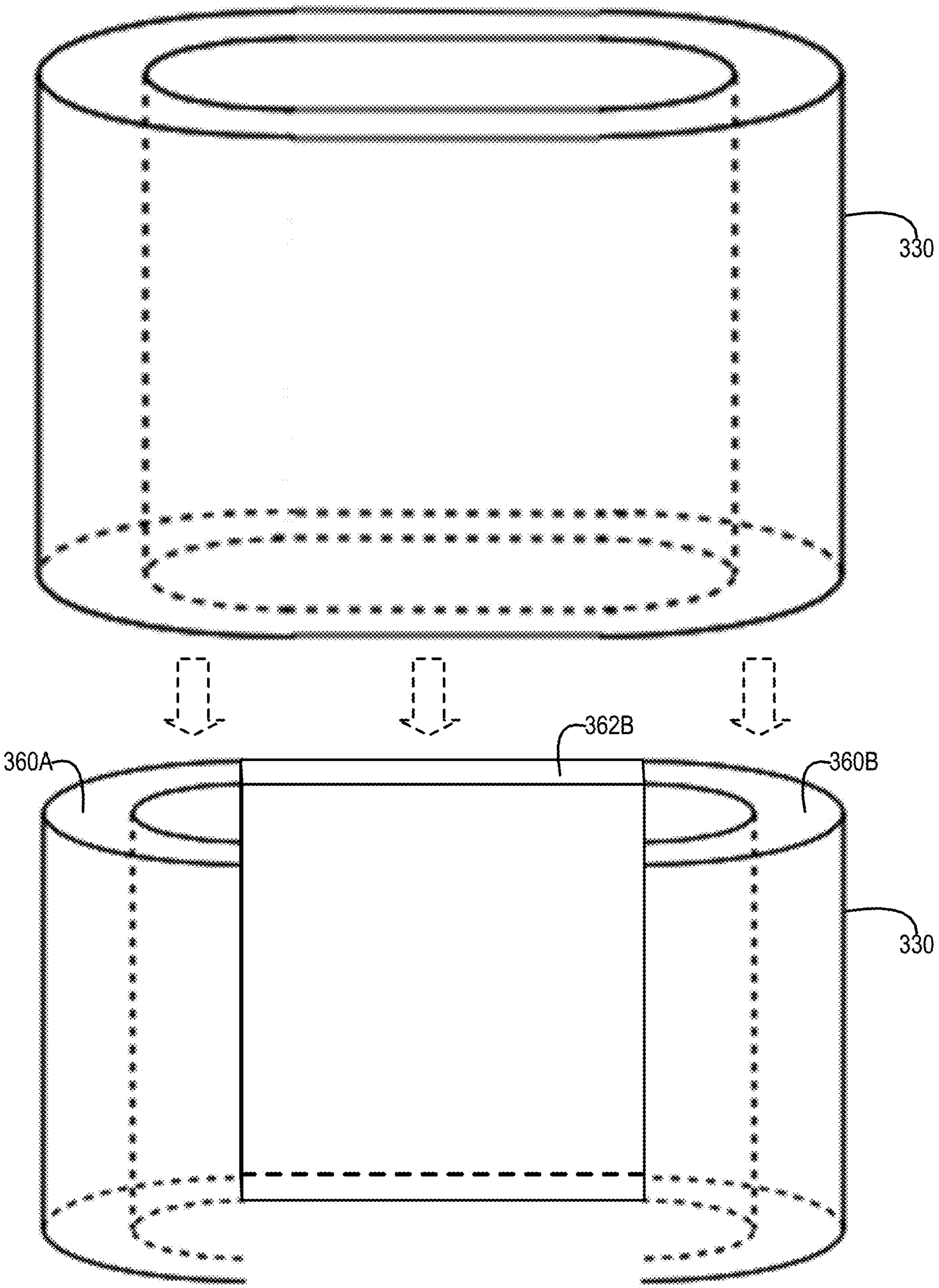
FIG. 3G illustrates an example of a dielectric material that forms a second rectangular cuboid between a first half ring and a second half ring, according to one or more embodiments.

Turning now to FIG. 3G, an example of a dielectric material that forms a second rectangular cuboid between a first half ring and a second half ring is illustrated, according to one or more embodiments. In one or more embodiments, dielectric material 330 may form first half ring 360A and second half ring 360B. For example, dielectric material 330 may form first half ring 360A and second half ring 360B surrounding dielectric material 340. In one or more embodiments, dielectric material 330 may form a second cuboid 362B. For example, cuboid 362B may be a rectangular cuboid. In one or more embodiments, cuboid 362B may be between half ring 360A and half ring 360B. For example, cuboid 362B may be formed between half ring 360A and half ring 360B. In one or more embodiments, half ring 360A, half ring 360B, cuboid 362A, and cuboid 362B may surround dielectric material 340.

Figure 3H:
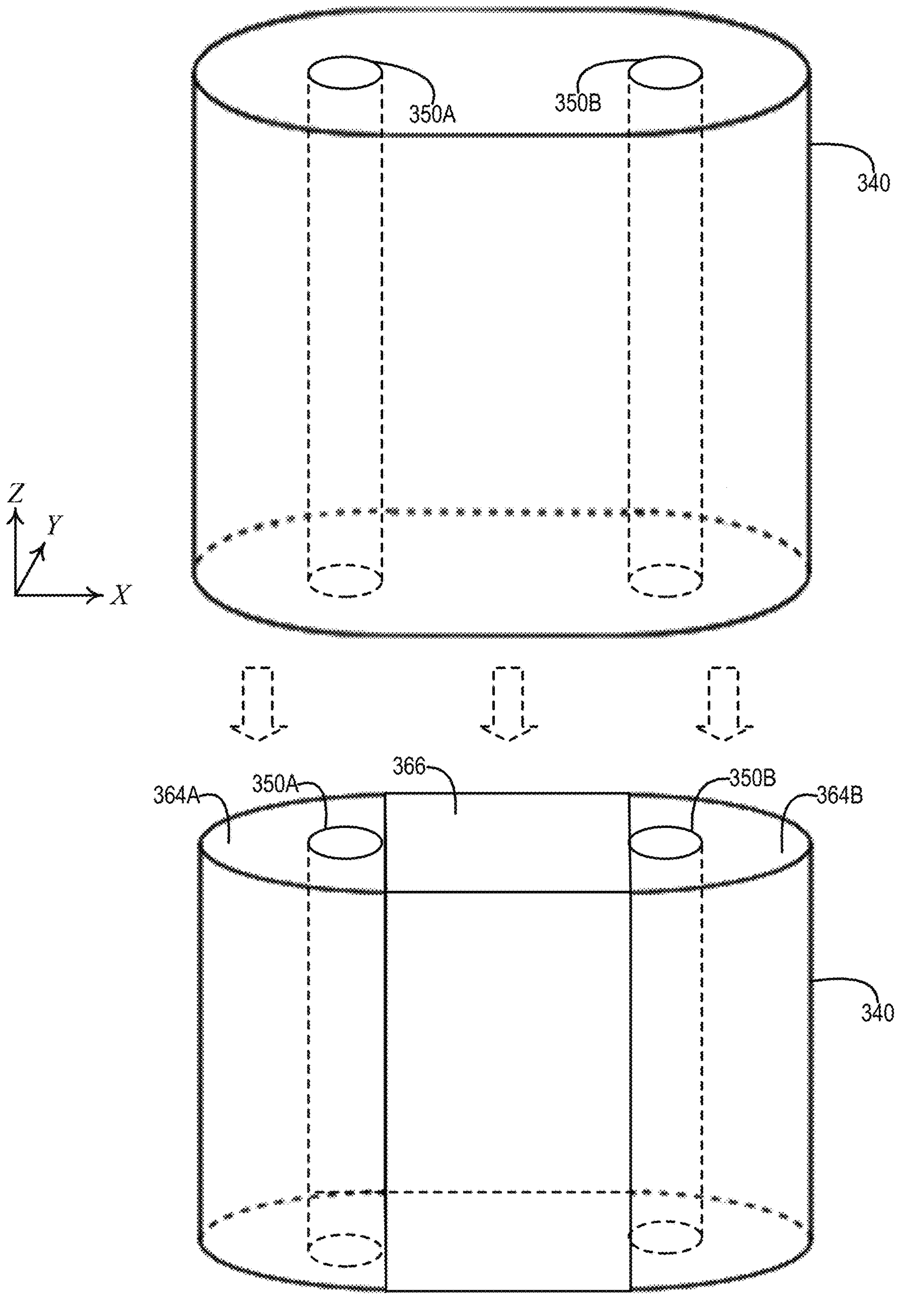
FIG. 3H illustrates an example of a dielectric material that forms a cuboid between a first half ring and a second half ring, according to one or more embodiments.

Turning now to FIG. 3H, an example of a dielectric material that forms a cuboid between a first half ring and a second half ring is illustrated, according to one or more embodiments. In one or more embodiments, dielectric material 340 may form a first half ring 364A surrounding a first conductor 350A of differential pair of conductors 350A and 350B. In one or more embodiments, dielectric material 340 may form a first half ring 364B surrounding a second conductor 350B of differential pair of conductors 350A and 350B. In one or more embodiments, dielectric material 340 may form a cuboid 366 between differential pair of conductors 350A and 350B. For example, cuboid 366 may be a rectangular cuboid.

Figure 3I:
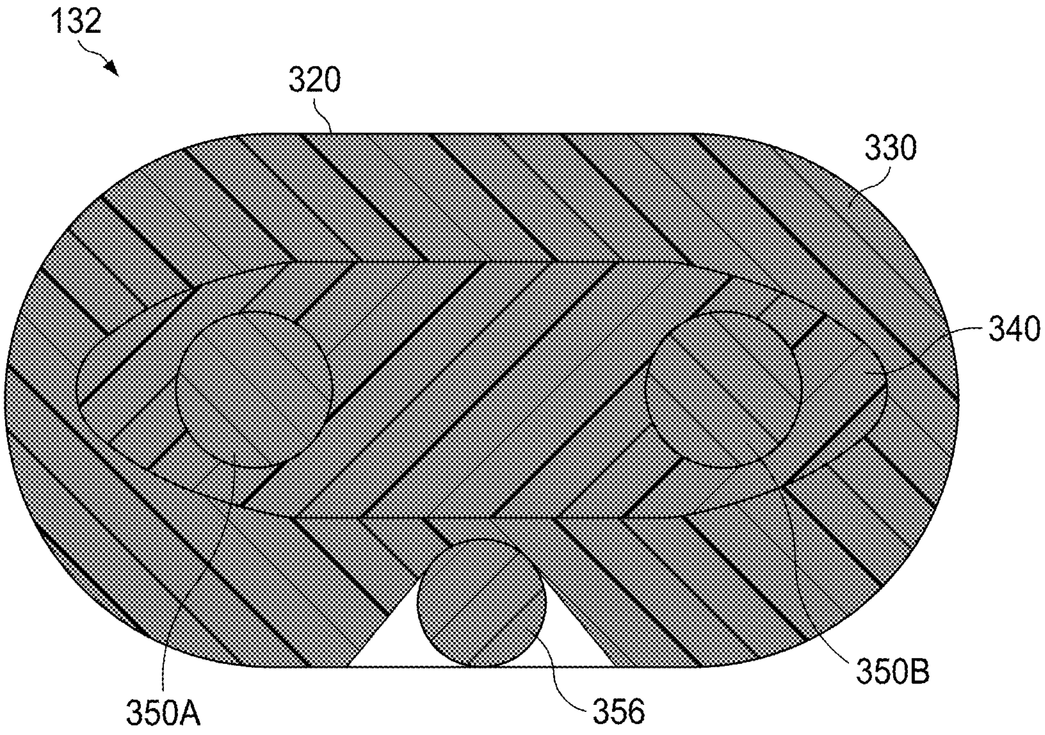
FIG. 3I illustrates an example of cross section of a data communications cable with a drain conductor, according to one or more embodiments.

Turning now to FIG. 3I, an example of cross section of a data communications cable with a drain conductor is illustrated, according to one or more embodiments. In one or more embodiments, data communications cable 132 may include a drain conductor 356. For example, drain conductor 356 may be a drain wire. For instance, the drain wire may be a 34 AWG wire. In one or more embodiments, drain conductor 356 may be outside dielectric material 330. For example, dielectric material 330 may include a furrow. For instance, drain conductor 356 may lie in the furrow of dielectric material 330. In one or more embodiments, signals transferred via conductors 350A and 350B may be referenced to drain conductor 356. In one or more embodiments, conductive shield 320 may surround drain conductor 356.

Figure 3J:
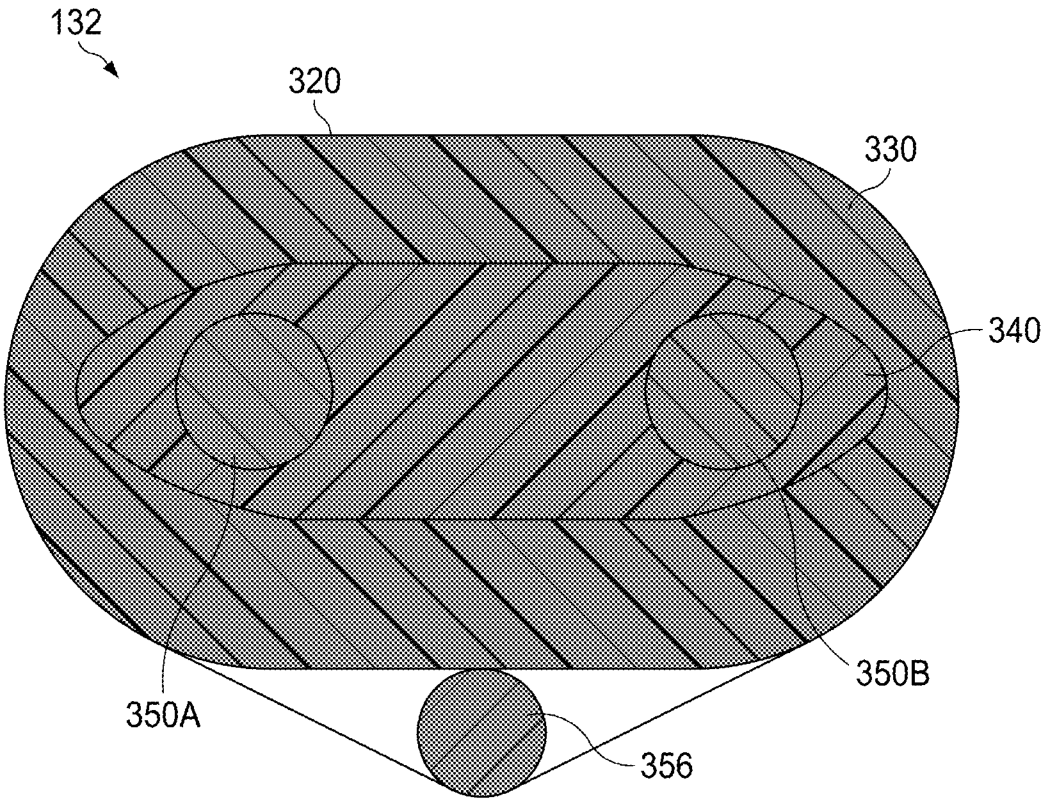
FIG. 3J illustrates another example of cross section of a data communications cable with a drain conductor, according to one or more embodiments.

Turning now to FIG. 3J, another example of cross section of a data communications cable with a drain conductor is illustrated, according to one or more embodiments. In one or more embodiments, data communications cable 132 may include a drain conductor 356. For example, drain conductor 356 may be a drain wire. For instance, the drain wire may be a 34 AWG wire. In one or more embodiments, drain conductor 356 may be outside dielectric material 330. For example, dielectric material 330 may not include a furrow. For instance, drain conductor 356 may not lie in a furrow of dielectric material 330. In one or more embodiments, an outer surface of dielectric material 330 may not have any concave portions. For example, drain conductor 356 may lie on the outer surface of dielectric material 330 that does not have any concave portions. In one or more embodiments, signals transferred via conductors 350A and 350B may be referenced to drain conductor 356. In one or more embodiments, conductive shield 320 may surround drain conductor 356.

Figure 3K:
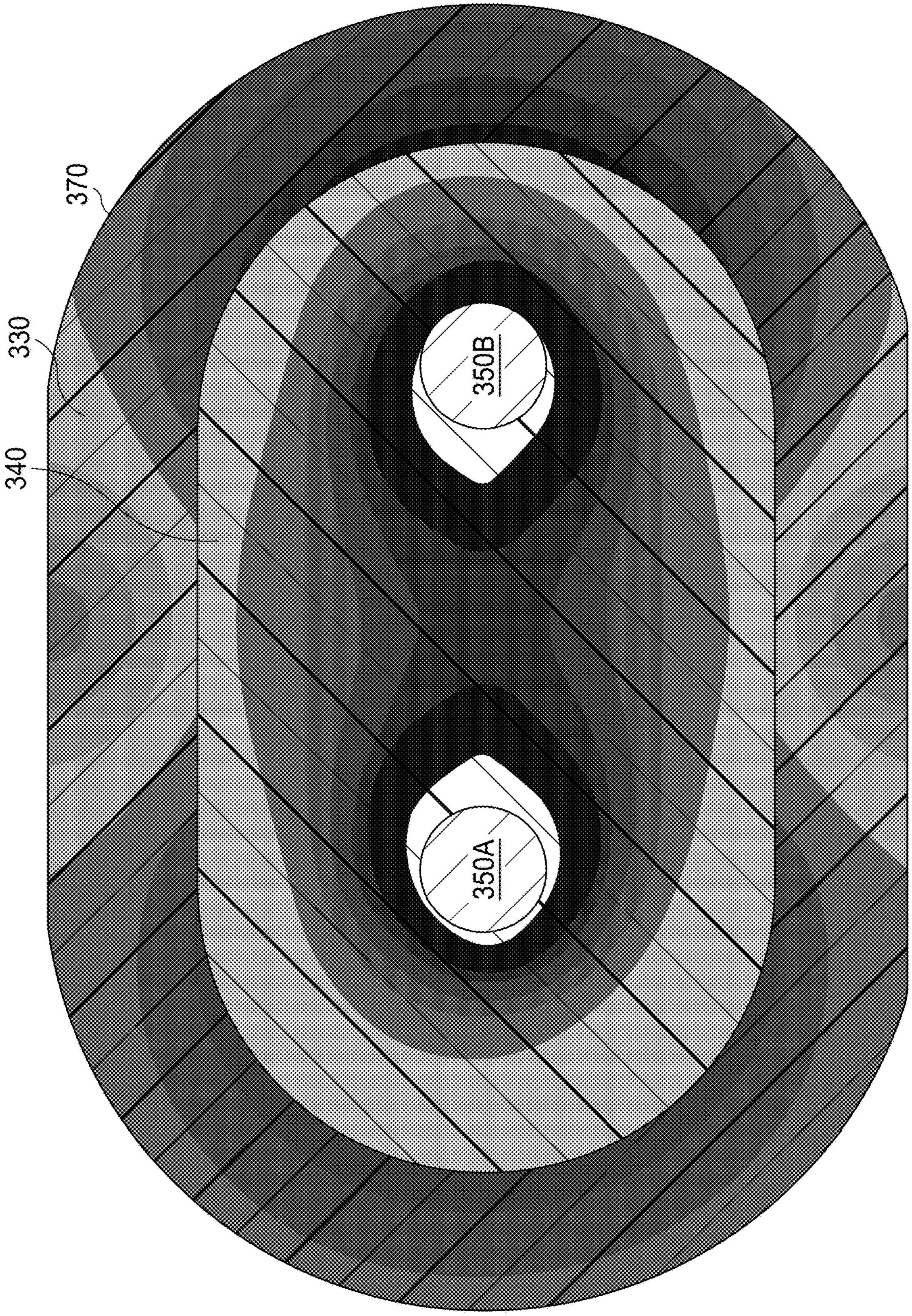
FIG. 3K illustrates an example cross sectional plot of electric field intensities of a data communications cable with dielectric materials with different relative permittivities, according to one or more embodiments.

Turning now to FIG. 3K, an example cross sectional plot of electric field intensities of a data communications cable with dielectric materials with different relative permittivities is illustrated, according to one or more embodiments. In one or more embodiments, a plot 370 shows a cross sectional plot of electric field intensities of data communications cable 132, in which a relative permittivity of dielectric material 340 greater than a relative permittivity of dielectric material 330. For example, stronger electric field intensities appear darker in plot 370. For instance, there may be a 0.1% capacitance change (e.g., a 0.1% capacitance increase) between conductors 350A and 350B with respect to a data communications cable 132 manufactured without one or more imprecisions in manufacturing.

Figure 3L:
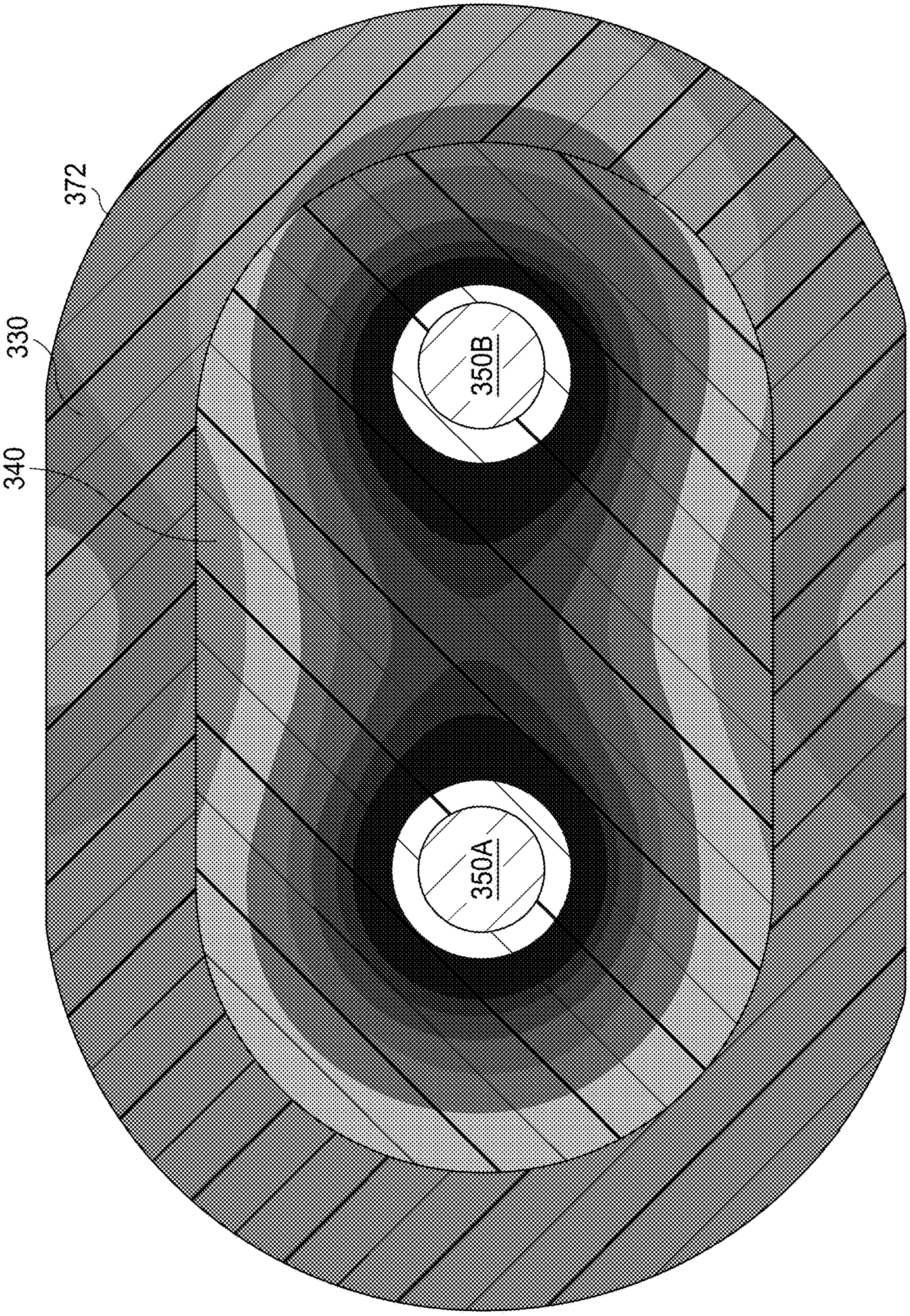
FIG. 3L illustrates an example cross sectional plot of electric field intensities of a data communications cable with dielectric materials with same relative permittivities, according to one or more embodiments.

Turning now to FIG. 3L, an example cross sectional plot of electric field intensities of a data communications cable with dielectric materials with same relative permittivities is illustrated, according to one or more embodiments. In one or more embodiments, a plot 372 shows a cross sectional plot of electric field intensities of data communications cable 132, in which a relative permittivity of dielectric material 340 is equal to a relative permittivity of dielectric material 330. For example, stronger electric field intensities appear darker in plot 372. For instance, there may be a 3% capacitance change (e.g., a 3% capacitance increase) between conductors 350A and 350B with respect to a data communications cable 132 manufactured without one or more imprecisions in manufacturing.

Figure 4A:
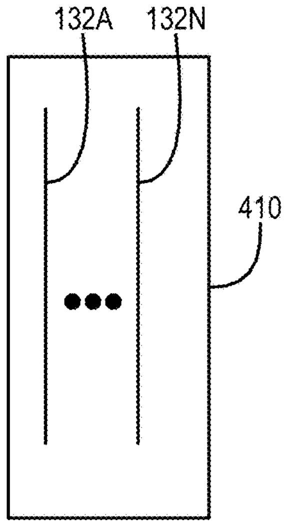
FIG. 4A illustrates an example of a data communications cable that includes multiple data communications cables, according to one or more embodiments.

Turning now to FIG. 4A, an example of a data communications cable that includes multiple data communications cables is illustrated, according to one or more embodiments. In one or more embodiments, a data communications cable may include multiple data communications cables. For example, a data communications cable 410 may include multiple data communications cables 132A-132N. In one or more embodiments, data communications cable 410 may not include any power transmission lines. Although data communications cables 132A-132N are illustrated, data communications cable 410 may include any number of data communications cables 132, according to one or more embodiments.

Figure 4B:
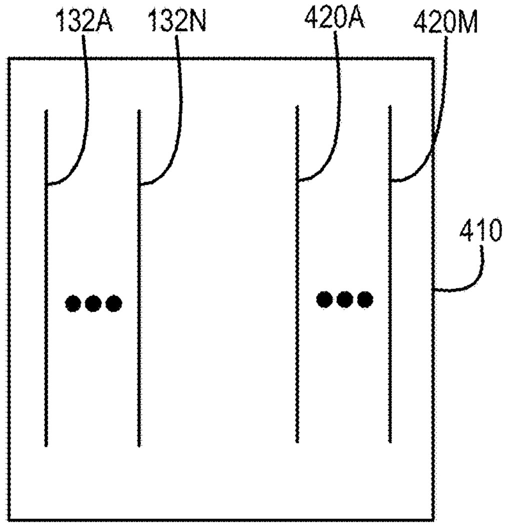
FIG. 4B illustrates an example of a data communications cable that includes multiple data communications cables and at least one power transmission line, according to one or more embodiments.

Turning now to FIG. 4B, an example of a data communications cable that includes multiple data communications cables and at least one power transmission line is illustrated, according to one or more embodiments. In one or more embodiments, a data communications cable may include multiple data communications cables. For example, data communications cable 410 may include multiple data communications cables 132A-132N. Although data communications cables 132A-132N are illustrated, data communications cable 410 may include any number of data communications cables 132, according to one or more embodiments. In one or more embodiments, a data communications cable may include one or more power transmission lines. For example, data communications cable 410 may include power transmission lines 420A-420M. Although power transmission lines 420A-420M are illustrated, data communications cable 410 may include any number of power transmission lines 420, according to one or more embodiments.

Figure 4C:
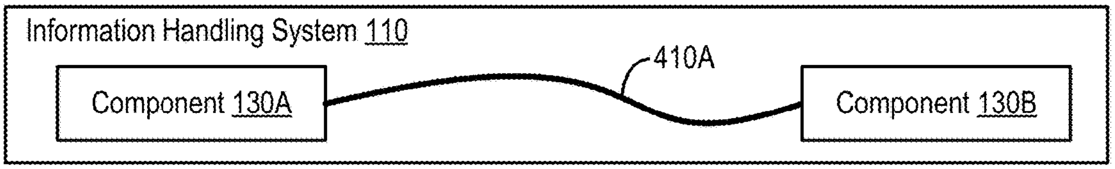
FIG. 4C illustrates a third example of an information handling system with a data communications cable communicatively coupling two information handling system components, according to one or more embodiments.

Turning now to FIG. 4C, a third example of an information handling system with a data communications cable communicatively coupling two information handling system components is illustrated, according to one or more embodiments. In one or more embodiments, IHS 110 may include information handling system components 130A and 130B. For example, an information handling system component 130 may include a processor, a volatile memory medium, a non-volatile memory medium, an I/O subsystem, and a network interface, a PCB, and an expansion card (e.g., a host bus adapter, a video card, a network adapter card, etc.), among others. In one or more embodiments, a data communications cable 410A may communicatively couple information handling system component 130A and information handling system component 130B. For example, a data communications cable 410 may include one or more data communications cables 132. For instance, information handling system component 130A and information handling system component 130B may communicate data via one or more data communications cables 132 of data communications cable 410A.

Figure 4D:
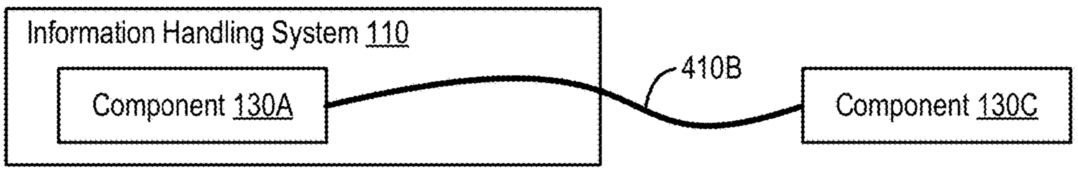
FIG. 4D illustrates another example of an information handling system with a data communications cable communicatively coupling two information handling system components, according to one or more embodiments.

Turning now to FIG. 4D, another example of an information handling system with a data communications cable communicatively coupling two information handling system components is illustrated, according to one or more embodiments. In one or more embodiments, IHS 110 may include information handling system component 130A, and an information handling system component 130C may be external to IHS 110. For example, an information handling system component 130 may include a processor, a volatile memory medium, a non-volatile memory medium, an I/O subsystem, and a network interface, a PCB, and an expansion card (e.g., a host bus adapter, a video card, a network adapter card, etc.), among others. In one or more embodiments, a data communications cable 410B may communicatively couple information handling system component 130A and information handling system component 130C. For example, a data communications cable 410 may include one or more data communications cables 132. For instance, information handling system component 130A and information handling system component 130C may communicate data via one or more include one or more data communications cables 132 of data communications cable 410B.

Figure 5:
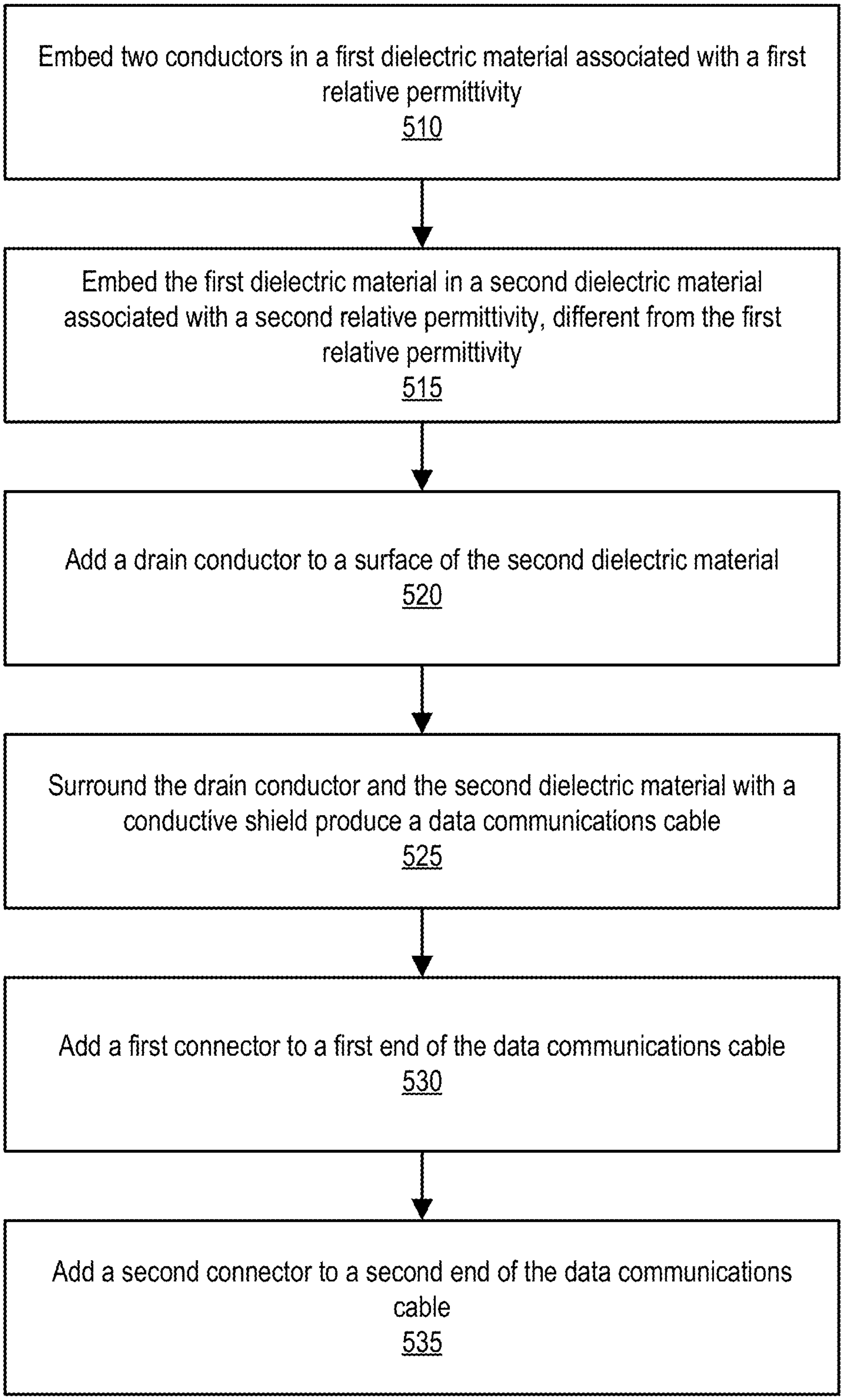
FIG. 5 illustrates an example of a method of making a data communications cable, according to one or more embodiments.

Turning now to FIG. 5, an example of a method of making a data communications cable is illustrated, according to one or more embodiments. At 510, two conductors may be embedded in a first dielectric material associated with a first relative permittivity. For example, conductors 350A and 350B may be embedded in dielectric material 340. At 515, the first dielectric material may be embedded in a second dielectric material associated with a second relative permittivity, different from the first permittivity. For example, dielectric material 340 may be embedded in dielectric material 330. In one or more embodiments, the first relative permittivity may be greater than the second relative permittivity. At 520, a drain conductor may be added to a surface of the second dielectric material. For example, a drain conductor may be added to a surface of dielectric material 330. At 525, the drain conductor and the second dielectric material may be surrounded by a conductive shield produce a data communications cable. For example, the drain conductor and the second dielectric material may be surrounded by a conductive shield to produce a data communications cable 132. At 530, a first connector may be added to a first end the data communications cable. For example, the first connector may be configured to be connected to information handling system component 130A. At 535, a second connector may be added to a second end the data communications cable. In one example, the first connector may be configured to be connected to information handling system component 130B. In another example, the first connector may be configured to be connected to information handling system component 130C.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:

at least one processor;

a memory medium, coupled to the at least one processor, that stores instructions executable by the at least one processor;

a first information handling system component; and a data communications cable configured to communicatively couple the first information handling system component to a second information handling system component;

wherein the data communications cable includes:

a differential pair of conductors;

a first half ring, a second half ring, and a cuboid formed from a first dielectric material, the first dielectric material associated with a first relative permittivity and completely surrounding the differential pair of conductors, the first half ring surrounds a first conductor of the differential pair of conductors and the second half ring surrounds a second conductor of the differential pair of conductors, the cuboid positioned between the first half ring and the second half ring such that the first half ring adjoins the cuboid and the second half ring adjoins the cuboid, the first dielectric material defining a first perimeter of the first half ring, the second half ring, and the cuboid; and a second dielectric material, associated with a second relative permittivity, completely surrounding the first dielectric material and adjoining the first dielectric material at the first perimeter of the first dielectric material, the second dielectric material including a second perimeter surrounding the first perimeter of the first dielectric material;

a conductive shield surrounding the second perimeter of the second dielectric material and in contact with a first portion of the second perimeter of the second dielectric material;

a drain conductor positioned outside of the second perimeter of the second dielectric material and in contact with a portion of the second perimeter of the outer surface of the second dielectric material;

wherein the first relative permittivity is greater than the second relative permittivity;

wherein a distance between the differential pair of conductors varies plus or minus an amount with a length of the data communications cable, wherein the conductive shield is spaced-apart from a second portion of the outer surface of the second dielectric material.

2. The information handling system of claim 1, wherein the cuboid between the differential pair of conductors is a rectangular cuboid between the differential pair of conductors.

3. The information handling system of claim 1, wherein the second dielectric material forms a third half ring surrounding the first dielectric material; and wherein the second dielectric material forms a fourth half ring surrounding the first dielectric material.

4. The information handling system of claim 3, wherein the second dielectric material forms a first rectangular cuboid between the third half ring and the fourth half ring; and wherein the second dielectric material forms a second rectangular cuboid between the third half ring and the fourth half ring.

5. The information handling system of claim 1, further comprising:

the second information handling system component.

6. The information handling system of claim 1, wherein the second information handling system component is external to the information handling system.

7. The information handling system of claim 1, wherein the data communications cable further includes:

a first connector at a first end of the data communications cable configured to be connected to the first information handling system component; and a second connector at a second end of the data communications cable configured to be connected to the second information handling system component.

8. A data communications cable, comprising:

a differential pair of conductors;

a first half ring, a second half ring, and a cuboid formed from a first dielectric material, the first dielectric material associated with a first relative permittivity and completely surrounding the differential pair of conductors, the first half ring surrounds a first conductor of the differential pair of conductors and the second half ring surrounds a second conductor of the differential pair of conductors, the cuboid positioned between the first half ring and the second half ring such that the first half ring adjoins the cuboid and the second half ring adjoins the cuboid, the first dielectric material defining a first perimeter of the first half ring, the second half ring, and the cuboid; and a second dielectric material, associated with a second relative permittivity, completely surrounding the first dielectric material and adjoining the first dielectric material at the first perimeter of the first dielectric material, the second dielectric material including a second perimeter surrounding the first perimeter of the first dielectric material;

a conductive shield surrounding the second perimeter of the second dielectric material and in contact with a first portion of the second perimeter of the second dielectric material;

a drain conductor positioned outside of the second perimeter of the second dielectric material and in contact with a portion of the second perimeter of the outer surface of the second dielectric material;

wherein the first relative permittivity is greater than the second relative permittivity;

wherein a distance between the differential pair of conductors varies plus or minus an amount with a length of the data communications cable, wherein the conductive shield is spaced-apart from a second portion of the outer surface of the second dielectric material.

9. The data communications cable of claim 8, wherein the cuboid between the differential pair of conductors is a rectangular cuboid between the differential pair of conductors.

10. The data communications cable of claim 8, wherein the second dielectric material forms a third half ring surrounding the first dielectric material; and wherein the second dielectric material forms a fourth half ring surrounding the first dielectric material.

11. The data communications cable of claim 10, wherein the second dielectric material forms a first rectangular cuboid between the third half ring and the fourth half ring; and wherein the second dielectric material forms a second rectangular cuboid between the third half ring and the fourth half ring.

12. The data communications cable of claim 8, further comprising:

a first connector at a first end of the data communications cable configured to be connected to a first information handling system component associated with an information handling system; and a second connector at a second end of the data communications cable configured to be connected to a second information handling system component associated with the information handling system.

* * * * *